United States Patent
Brandt

(10) Patent No.: US 7,784,814 B2
(45) Date of Patent: Aug. 31, 2010

(54) SKIS AND SKI BOOTS COMBINATION

(75) Inventor: Helmut Brandt, Leopoldsdorf (AT)

(73) Assignee: Tyrolia Technology GmbH (AT)

( * ) Notice: Subject to any disclaimer, the term of this patent is extended or adjusted under 35 U.S.C. 154(b) by 296 days.

(21) Appl. No.: 10/580,304

(22) PCT Filed: Nov. 24, 2003

(86) PCT No.: PCT/EP03/13175

§ 371 (c)(1),
(2), (4) Date: May 22, 2006

(87) PCT Pub. No.: WO2005/053802

PCT Pub. Date: Jun. 16, 2005

(65) Prior Publication Data

US 2007/0145721 A1  Jun. 28, 2007

(51) Int. Cl.
*A63C 9/081* (2006.01)
(52) U.S. Cl. .................. 280/618; 280/625
(58) Field of Classification Search ............ 280/607, 280/613, 616, 617, 618, 625, 633, 634, 14.22, 280/11.22; 36/117.3, 10, 31
See application file for complete search history.

(56) References Cited

U.S. PATENT DOCUMENTS

| | | | | |
|---|---|---|---|---|
| 3,852,896 A | * | 12/1974 | Pyzel et al. ............ | 280/617 |
| 3,987,533 A | * | 10/1976 | Sandgren ............... | 29/410 |
| 4,078,322 A | * | 3/1978 | Dalebout ............... | 36/117.4 |
| 4,083,128 A | | 4/1978 | Rossman | |
| 4,141,570 A | * | 2/1979 | Sudmeier .............. | 280/607 |
| 4,177,584 A | | 12/1979 | Beyl | |
| 4,245,409 A | * | 1/1981 | Beyl ..................... | 280/613 |
| 4,408,779 A | * | 10/1983 | Shekter ................. | 280/607 |
| 5,071,154 A | * | 12/1991 | Szasz et al. ............ | 280/618 |
| 5,261,688 A | * | 11/1993 | Rohrmoser ............. | 280/617 |
| 5,273,305 A | | 12/1993 | Erdei et al. | |
| 5,344,178 A | * | 9/1994 | Rohrmoser ............. | 280/617 |

(Continued)

FOREIGN PATENT DOCUMENTS

DE  199 36 519 A1  2/2001

(Continued)

OTHER PUBLICATIONS

International Search Report with English language translation.

(Continued)

*Primary Examiner*—Hau V Phan
(74) *Attorney, Agent, or Firm*—Ostrolenk Faber LLP

(57) ABSTRACT

The combination of ski boots of different sizes, and skis provided with mounted bindings consisting of fixed front and rear jaws. The ski boots are embodied in at least two types (1, 1', 1") which differ from each other by a sole length (a, b, c) and are suitable for inserting internal shoes (3*a* to 3*d*, 3'*a* to 3'*d*, 3"*a* to 3"*d*) into at least two boot sizes (2*a*-2*b*, 2'*a*-2'*b*, 2"*a*-2"*b*). The skis (6, 6', 6") are provided with fixed jaws (7*a*, 7*b*, 8*a*, 8*b*, 9*a*, 9*b*) mounted in such a way that they correspond to the sole lengths (a, b, c) of the different types of boots (1, 1', 1").

20 Claims, 2 Drawing Sheets

U.S. PATENT DOCUMENTS

| | | | |
|---|---|---|---|
| 5,498,017 | A | 3/1996 | Rohrmoser |
| 5,575,496 | A | 11/1996 | Luitz et al. |
| 6,471,235 | B1 | 10/2002 | Luitz et al. |
| 6,779,810 | B1 * | 8/2004 | Mangold .................... 280/634 |
| 2002/0092182 | A1 | 7/2002 | Coplon et al. |
| 2002/0113413 | A1 | 8/2002 | Sosin et al. |

FOREIGN PATENT DOCUMENTS

| | | |
|---|---|---|
| GB | 1 214 738 | 12/1970 |
| WO | 96/13183 | 5/1996 |
| WO | WO 96/13183 | 5/1996 |
| WO | WO 02/47776 A2 | 6/2002 |

OTHER PUBLICATIONS

Opposition paper filed in the EPO by Salomon SAS on Oct. 14, 2009, against European Patent EP 1 687 072 B1 of the applicant Tyrolia Technology GmbH, which corresponds to U.S. Appl. No. 10/580,304, filed May 22, 2006.

Atomic Tech Manual 2002/03 catalogue, published on Feb. 2, 2002.

Atomic Alpine Collection 2002/03 catalogue, published on Feb. 2, 2002.

Oxygen 2002/03 catalogue, published on Feb. 2, 2002.

Atomic Rental-System catalogue, published on Feb. 1, 2003.

English translation of International Preliminary Examination Report on Patentability.

* cited by examiner

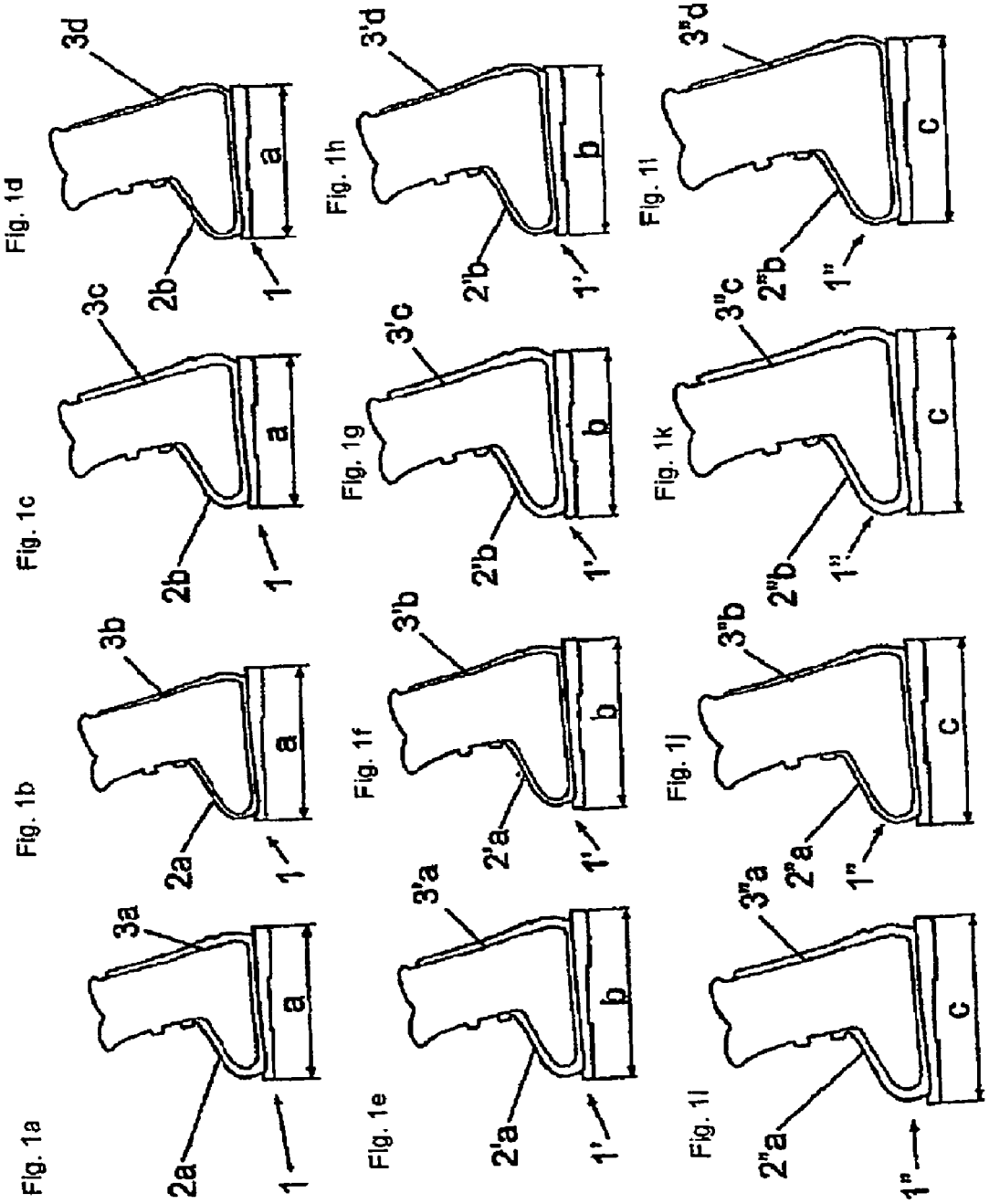

SKIS AND SKI BOOTS COMBINATION

CROSS-REFERENCE TO RELATED APPLICATION

The present application is a 35 U.S.C. §371 national phase conversion of PCT/EP2003/013175 filed Nov. 24, 2003, which is incorporated herein in its entirety. This application is related to Ser. No. 11/576,517, filed Jan. 14, 2008 which is the U.S. National Phase of PCT/EP2004/011038 filed Oct. 2, 2004.

BACKGROUND

1. Technical Field

The invention relates to a combination of ski boots of different sizes and skis with mounted bindings comprising a front jaw and a heel jaw.

2. Related Art

Ski-hire stations are usually equipped according to requirement with a number of skis of different types and different lengths with premounted ski bindings. Ski boots of different sizes complete the range. The ski bindings arranged in such a way on the ski by means of suitable mechanisms that the relative spacing of the two binding jaws can be set within a relatively wide range for adapting the binding to ski boots of different lengths. This gives rise to time-intensive setting and adjustment effort on the part of the personnel of the ski-hire stations. Ski-hire stations therefore also need well-trained personnel.

SUMMARY

This forms the starting point for the invention, which is based on the object of providing a combination of skis with premounted bindings and ski boots of different sizes which is particularly suitable for a hire system, requires less setting and adjustment effort and ensures the customers and also the personnel of the hire station a simple, time-saving and clear procedure.

According to the invention, the object set is achieved by a combination with ski boots which belong to at least two ski boot types which differ from one another in sole length and are suitable for the insertion of inner boots in at least two boot sizes, and with skis on which the binding jaws are mounted according to the different sole lengths.

Combinations according to the invention are optimally suitable for hire stations. The invention allows easy assignment of the boots from the ski boot types provided to the skis provided with the bindings. It is no longer necessary to adapt the binding spacing to the selected boot which fits the customer. This makes the procedure easier for the personnel of the hire station and has for the customer above all the advantage of being very time-saving.

The invention includes a large number of combinations of which some are particularly advantageous. In this regard, it is also above all to be possible, with good clarity, to provide as far as possible all the desired ski boot sizes. In this connection, it is advantageous if a combination according to the invention comprises at least three ski boot types and if a number of shells of different size which, however, have corresponding sole lengths belong to each ski boot type.

In the case of three or more different ski boot types, it is advantageous if two shells of different size belong to each ski boot type. In this case, the combination according to the invention can be embodied especially simply in such a way that all the ski boot sizes usually desired can be provided.

For this, for example, a number, in particular two, of shells of each shell size of a ski boot type are provided, only one inner boot of a given size being insertable into each of these shells. These shells of the same size are embodied in particular in such a way that an inner boot of a given size fits into one shell and an inner boot of the next or neighboring size can be inserted into the other of these shells. There are therefore shells of the same size which differ in their inner space. This can be brought about in a simple way by virtue of the fact that, for example, of two shells of the same size, one is adapted to an inner boot of a smaller size by an inserted insole or the like. Combinations according to the invention can therefore be designed in very varied ways. Ski boot shells and inner boots are of course provided in pairs in the corresponding number and size in the hire stations.

For the customer, it is above all important to be able to hire the combination of ski boot and ski suitable for him as rapidly as possible. It is therefore advantageous if the ski boot types and their shells and also the inner boots and the skis can be assigned to one another by means of corresponding codes or markings or the like.

According to the invention, the object set is achieved by a combination comprising ski boots which belong to at least two ski boot (outer shell) types which differ from one another in sole length and are each suitable for the insertion of inner boots in at least two boot sizes (foot sizes), and further comprising skis on which the binding jaws are mounted according to the different sole lengths.

BRIEF DESCRIPTION OF THE DRAWINGS

Further features, advantages and details of the invention are described in greater detail with reference to the drawings which represents an illustrative embodiment diagrammatically and in which FIGS. 1a-1l show ski boots belonging to an embodiment of a combination according to the invention.

DETAILED DESCRIPTION

Figure 2A:
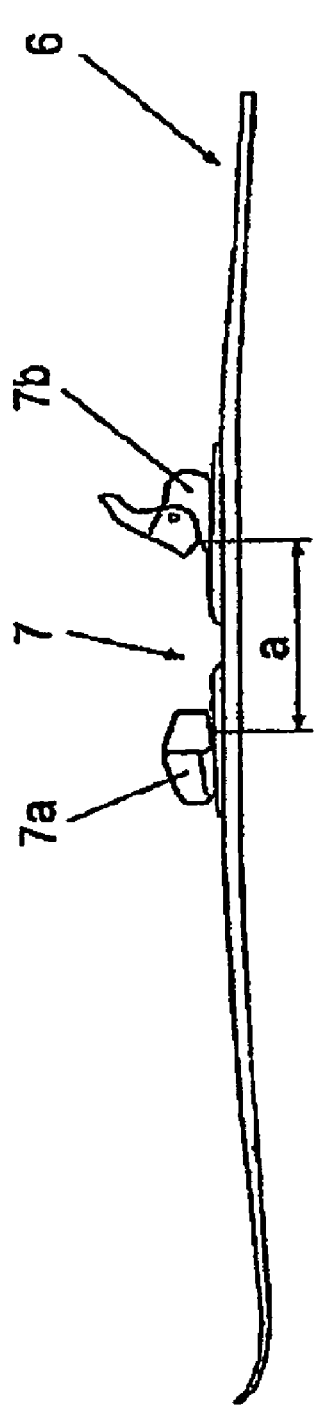
FIGS. 2a-2c show three skis of the same length belonging to an embodiment of a hire system according to the invention.

Essential components of a combination according to the invention of ski boots and skis for a hire system for alpine skiing are at least two, in the embodiment illustrated three, different ski boot types 1, 1', 1". Two smaller outer shells 2a, 2'a, 2"a and two larger outer shells 2b, 2'b, 2"b belong in each case to a ski boot type 1, 1', 1". The shells 2a, 2b and 2'a, 2'b and also 2"a, 2"b belonging to each boot type 1, 1', 1" have in each case a corresponding sole length a, b, c. The two outer shells 2a are the same size at least on the outside; in particular, they are correspondingly embodied. This also applies for the other outer shells 2b, 2'a, 2'b, 2"a, 2"b which are the same size in pairs.

The two shells 2a of the same size of boot type 1 are embodied in such a way on the inside that one shell 2a can receive an inner boot 3a of size 23 and the associated half size, for example, and the second shell 2a can receive an inner boot 3b of size 24 and the associated half size. For this, at least one insole can be introduced into the shell 2a intended for the smaller inner boot of size 23 in order to adapt the inner space of the shell 2a to the smaller inner boot. The same applies for the two outer shells 2b and the inner boots 3c, 3d which can be inserted into them, which, for example, correspond to boot sizes 25 and 26.

The insole which makes the inner space of a shell smaller and adapts it to an inner boot of a given size can be a one-part or multi-part insole and is in particular made from plastic. An embodiment is furthermore preferred in which the insole lines the toe region of the inner space and the lateral regions adjoining the sole of the inner sides of the shell.

All the outer shells 2'a and 2'b belonging to ski boot type 1' have the sole length b and, as already mentioned, are of different size. An inner boot 3'a of boot size 27 and one of the associated half size, for example, can be inserted into one outer shell 2'a which, as likewise mentioned, is adapted accordingly on the inside via an insole, for example, and an inner boot 3'b of size 28 and of the associated half size can be inserted into the second outer shell 2'a. The same applies for the two shells 2'b and the inner boots 3'c, 3'd which can be inserted into them, which can correspond to boot sizes 29 and 30. The same also applies for the ski boots of ski boot type 1" with regard to the pairs of outer shells 2"a, 2"b and also with regard to the inner boots 3"a to 3"d which can be inserted into them, which can correspond to boot sizes 31 to 34.

Figure 2B:
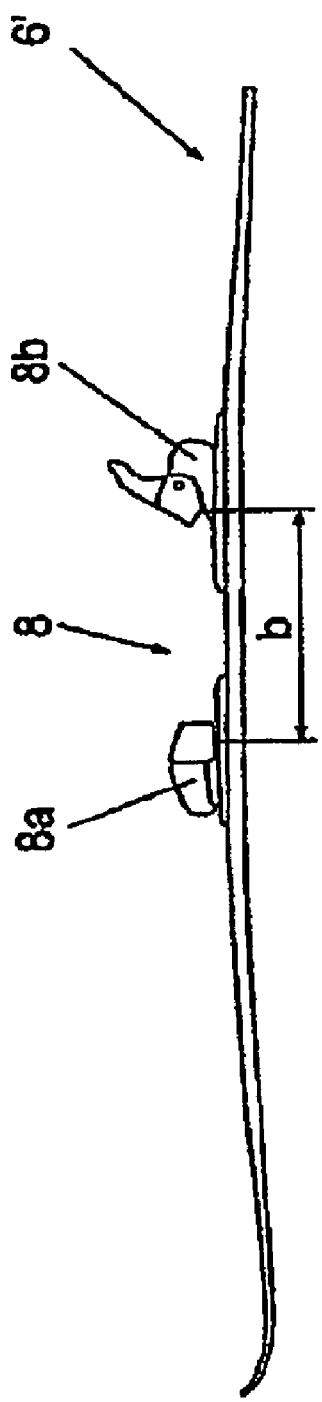
Figure 2C:
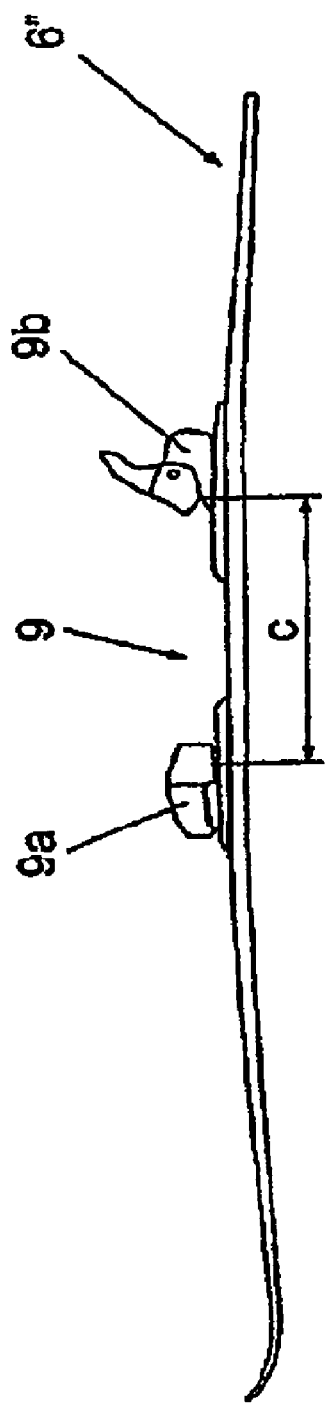

FIG. 2 shows three skis 6, 6", 6" of the same length, which in each case belong to a ski pair, with mounted ski bindings 7, 8, 9 consisting in each case of a front jaw 7a, 8a, 9a and a heel jaw 7b, 8b, 9b. The two binding jaws 7a, 7b mounted on the ski 6 are with regard to their relative spacing geared to the sole length a of ski boot type 1, on the ski 6' the two binding jaws 8a, 8b are mounted according to the sole length b of ski boot type 1', and on the ski 6" the two binding jaws 9a, 9b are mounted according to the sole length c of ski boot type 1". A ski boot of type 1 can therefore be inserted into the binding 7, a ski boot of type 1' into the binding 8 and a ski boot of type 1" into the binding 9 without further adjustment.

It is consequently not necessary to have to adjust the bindings 7, 8, 9 with regard to their relative spacing. Use can therefore be made of a simple rail system for fastening the binding jaws to the ski without the possibility of longitudinal adjustment. With the binding jaws mounted at corresponding relative spacings according to the boot types, skis of different lengths and embodiments can be provided.

A combination according to the invention of ski boots and skis for hire systems comprises in each case a number of ski pairs 6, 6', 6" and a corresponding number of ski boot pairs of boot types 1, 1', 1" and is convenient and easy to handle. The handling of the hire system is particularly time-saving and convenient for the personnel of the ski-hire station especially when use is made of a coding system which allows simple assignment of the boots to the ski pairs. For example, coding systems are suitable which use colors in such a way that, for example, a ski boot type with a red marking fits into the binding of a ski which is likewise provided with a red marking. Any desired code can be provided on skis, boots and bindings.

Combinations according to the invention for hire systems comprise at least two, preferably three, or even more than three ski boot types (lengths) and/or for each ski boot type more than two shells of different size with the same sole length. It should also be mentioned that different ski binding systems can also be used within a hire system according to the invention as long as appropriate binding connection regions for the ski boot shells are present.

Although particular embodiments have been described, many other variations and modifications and other uses will become apparent to those skilled in the art. Therefore, the present invention is not limited by the specific disclosure herein.

The invention claimed is:

1. In combination,
  a) a first plurality of ski boots each having a first sole length, said first plurality of ski boots comprising shells of first and second shell types;
  inner boots of first, second, third and fourth respective foot sizes;
  said first type shells being configured for receiving said inner boots of said first and second foot sizes;
  said second type shells being configured for receiving said inner boots of said third and fourth foot sizes;
  b) a second plurality of ski boots each having a second sole length, said second plurality of ski boots comprising shells of third and fourth shell types;
  inner boots of fifth, sixth, seventh and eighth respective foot sizes;
  said third type shells being configured for receiving said inner boots of said fifth and sixth foot sizes;
  said fourth type shells being configured for receiving said inner boots of said seventh and eighth foot sizes; and
  c) a plurality of skis each having front and rear bindings mounted in fixed position thereon; a first group of said bindings being mounted with a first fixed spacing for binding said shells of said first sole length; a second group of said bindings being mounted with a second fixed spacing for binding said shells of said second sole length.

2. The combination as claimed in claim 1, further comprising (d) a third plurality of ski boots having shells of a respective third sole length; and a third group of said bindings mounted in fixed position on said plurality of skis being mounted with a third fixed spacing for receiving said shells of said third sole length.

3. The combination as claimed in claim 1, characterized in that the respective shells of each said shell type have respective interior configurations that match said inner boots of said different respective foot sizes.

4. The combination as claimed in claim 3, characterized in that an inner boot of a given size matches one shell of a same shell type and an inner boot of a neighboring size matches another shell of the same shell type.

5. The combination of claim 4, wherein:
  inserts are provided for at least some of said shells of said first through fourth shell types for providing said respective interior configurations of said shells for matching corresponding inner boots of respective ones of said first through eighth foot sizes.

6. The combination of claim 3, wherein:
  inserts are provided for at least some of said shells of said first through fourth shell types for providing said respective interior configurations of said shells for matching corresponding inner boots of respective ones of said first through eighth foot sizes.

7. The combination as claimed in claim 1, characterized in that said skis, said shells and said inner boots have respective markings indicating which of said shells fit into which of said skis, and which of said inner boots fit into which of said shells.

8. The combination of claim 2, wherein:
  said third plurality of ski boots (d) has shells of fifth and sixth shell types;
  said fifth type shells being configured for receiving inner boots of ninth and tenth foot sizes;
  said sixth type shells being configured for receiving inner boots of eleventh and twelfth foot sizes.

9. The combination of claim 8, wherein:
  inserts are provided for at least some of said shells of said first through sixth shell types for configuring said shells for matching corresponding inner boots of respective ones of said first through twelfth foot sizes.

10. The combination of claim 1, wherein:
inserts are provided for at least some of said shells of said first through fourth shell types for configuring said shells for matching corresponding inner boots of respective ones of said first through eighth foot sizes.

11. A method for providing a combination of skis with fixed bindings, and ski boots which fit said bindings, comprising the steps of:
   a) providing a first plurality of ski boots each having a first sole length, said first plurality of ski boots comprising shells of first and second shell types;
   providing inner boots of first, second, third and fourth respective foot sizes;
   said first type shells being configured for receiving said inner boots of said first and second foot sizes;
   said second type shells being configured for receiving said inner boots of said third and fourth foot sizes;
   b) providing a second plurality of ski boots each having a second sole length, said second plurality of ski boots comprising shells of third and fourth shell types;
   providing inner boots of fifth, sixth, seventh and eighth respective foot sizes;
   said third type shells being configured for receiving said inner boots of said fifth and sixth foot sizes;
   said fourth type shells being configured for receiving said inner boots of said seventh and eighth foot sizes; and
   c) providing a plurality of skis each having front and rear bindings mounted in fixed position thereon; a first group of said bindings being mounted with a first fixed spacing for binding said shells of said first sole length; a second group of said bindings being mounted with a second fixed spacing for binding said shells of said second sole length.

12. The method as claimed in claim 11, further comprising providing said skis, said shells and said inner boots with respective markings indicating which of said shells fit into which of said skis, and which of said inner boots fit into which of said shells.

13. The method as claimed in claim 11, characterized in that the respective shells of each said shell type are provided with respective interior configurations that match said inner boots of said different respective foot sizes.

14. The method as claimed in claim 13, characterized in that an inner boot of a given size is provided to match one shell of a same shell type and an inner boot of a neighboring size is provided to match another shell of the same shell type.

15. The method of claim 14, further comprising providing inserts for at least some of said shells of said first through fourth shell types, for providing said respective interior configurations of said shells for matching corresponding inner boots of respective ones of said first through eighth foot sizes.

16. The method of claim 13, further comprising providing inserts for at least some of said shells of said first through fourth shell types, for providing said respective interior configurations of said shells for matching corresponding inner boots of respective ones of said first through eighth foot sizes.

17. The method as claimed in claim 11, further comprising:
   (d) providing a third plurality of ski boots having shells of a respective third sole length; and
   providing a third group of said bindings mounted in fixed position on said plurality of skis with a third fixed spacing for receiving said shells of said third sole length.

18. The method of claim 17, further comprising:
   providing said third plurality of ski boots (d) with shells of fifth and sixth shell types;
   configuring said fifth type shells for receiving inner boots of ninth and tenth foot sizes; and
   configuring said sixth type shells for receiving inner boots of eleventh and twelfth foot sizes.

19. The method of claim 1, further comprising providing inserts for at least some of said shells of said first through sixth shell types, for configuring said shells for matching corresponding inner boots of respective ones of said first through twelfth foot sizes.

20. The method of claim 11, further comprising providing inserts for at least some of said shells of said first through fourth shell types, for configuring said shells for matching corresponding inner boots of respective ones of said first through eighth foot sizes.

* * * * *